(12) United States Patent
Kesinger

(10) Patent No.: US 6,945,145 B1
(45) Date of Patent: Sep. 20, 2005

(54) QUICK ACTION TAP WRENCH

(76) Inventor: Donald A. Kesinger, 279 W. Jamison Cir., #56, Littleton, CO (US) 80120

( * ) Notice: Subject to any disclaimer, the term of this patent is extended or adjusted under 35 U.S.C. 154(b) by 0 days.

(21) Appl. No.: 10/918,270

(22) Filed: Aug. 14, 2004

Related U.S. Application Data

(60) Provisional application No. 60/511,669, filed on Oct. 17, 2003.

(51) Int. Cl.[7] ................................................. B25B 3/00
(52) U.S. Cl. ............................ 81/487; 81/114; 279/42; 279/53
(58) Field of Search .................. 81/487, 114, 53.4, 81/489, 58.3, 113; 279/53, 43, 54, 42; 408/240, 408/136, 137, 340

(56) References Cited

U.S. PATENT DOCUMENTS

| 192,423 | A | * | 6/1877 | Eltrich ........................ 408/240 |
| 2,176,071 | A | * | 10/1939 | Hall ............................. 279/54 |
| 2,351,232 | A | * | 6/1944 | Schnabolk .................... 81/114 |
| 2,756,060 | A | * | 7/1956 | Tomchek ...................... 279/14 |
| 4,087,195 | A |   | 5/1978 | Wood |
| 4,687,384 | A | * | 8/1987 | McCoy ........................ 408/10 |
| 4,799,832 | A | * | 1/1989 | Abbott ....................... 408/123 |
| 4,984,942 | A |   | 1/1991 | Holtz |
| 5,507,608 | A |   | 4/1996 | Forslind |
| 5,733,199 | A |   | 3/1998 | Capri |
| 5,810,504 | A |   | 9/1998 | Rabinovich |
| 6,056,283 | A | * | 5/2000 | Gage et al. ................... 269/49 |

* cited by examiner

Primary Examiner—Hadi Shakeri
(74) Attorney, Agent, or Firm—Thomas W. Hanson

(57) ABSTRACT

A quick action, cam operated hand tool holder, such as a tap wrench. The cam is moveable between at least one released and one locked positions, preferably by a conventional T-handle. A third position may also be provided which may be either a second locked or a second released position. An adjustable nut, or similar, retains a collet within the wrench and adjusts the wrench to different sizes of tools (i.e. taps) and adjusts the gripping force applied when the cam is locked. The collet is preferably reversible, accommodating different tool sizes on each end, but may also be single ended.

11 Claims, 5 Drawing Sheets

QUICK ACTION TAP WRENCH

CROSS-REFERENCE TO RELATED APPLICATIONS

This application claims the benefit of U.S. Provisional Application No. 60/511,669 filed Oct. 17, 2003.

STATEMENT REGARDING FEDERALLY SPONSORED RESEARCH OR DEVELOPMENT

Not Applicable

BACKGROUND OF THE INVENTION

1. Field of the Invention

The present invention relates to the field of holders for hand tools and specifically to those which use a collet to grasp the tool. Even more specifically it relates to such tools as re intended for use with threading taps.

2. Background Information

The conventional tap wrench, as used to tap threads by hand, is well known to machinists, mechanics and others who have need to perform this operation. The design of this wrench is almost constant across most if not all manufacturers. A cylindrical body is fitted with a sliding T-handle and one end and a set of tapered, somewhat flexible fingers at the other. The fingers are adapted to receive and grip the non-working end of a tap. A nut, fitted over the fingers threads on to the wrench and tightens against the fingers. A tapered inner surface on the nut forces the fingers together, gripping the tap.

This design suffers from several drawbacks. Most of these stem from the fact that significant rotational force is applied to the tap during the threading operation. This requires that the fingers both grip tightly and transmit this force to the tap without breaking. This combination requires that the fingers be relatively thick and broad and are typically hardened. This in turn limits their flexibility and thus the size range of taps which a particular wrench can grip. Because of this, it is common for a user to own two or more tap wrenches to accommodate a range of taps covering the common sizes from #0 through ½".

Another side effect of the forces applied by the wrench is the required gripping force which must be applied to the tap. This typically requires that the nut be tightened by a wrench. This increases the setup time and requires the use of a tool in addition to the tap wrench in order to perform the operation.

A common characteristic of standard tap wrenches is that the T-handle must be removed for storage. If the handle is not removed, significantly greater space is required. If the handle is removed, it may become separated from the wrench and possibly lost.

There is a need for a tap wrench which can be quickly and securely fastened without the use of an external wrench. It should also accept a wider range of taps than is typical, preferably the entire range of #0 to ½". Preferably, it will be approximately the same size and weight as a conventional wrench. Ideally, it would store in minimal space without removing the handle.

BRIEF SUMMARY OF THE INVENTION

The present invention is directed to a tap wrench or similar device which grips a tool, such as a tap. It improves upon the prior art by using an eccentric cam to apply force to a collet, rather than the conventional nut. This makes it quicker and easier to use and, by using the handle to also operate the cam, eliminates the need for a separate wrench to tighten the nut. By using a double ended, reversible collet, the effective grip range of the wrench is effectively doubled.

According to the invention there is provided a main body, a collet which fits within the body, a retaining means to hold the collet in place, and a cam, pivotally mounted to the body and acting on the collet to force it against the retaining means. This force causes the end of the collet to compress, gripping the tool.

According to an aspect of the invention an adjustment mechanism is also provided which allows the force applied by the cam to be adjusted, which in turn adjusts the force applied by the collet on the tool. The simplest known method of providing this is to thread the retaining means onto the end of the body so that it can be adjusted inward and outward.

According to another aspect of the invention a handle is provided, connected to the cam in such a way that it both operates the cam and functions as a handle to rotate the tap wrench about its longitudinal axis. It is preferably fitted in such a way that when the cam is in its released position, the handle is parallel to the body of the wrench, forming a compact storage configuration. The cam may also have a second locked position in which the handle is also parallel to the body of the wrench.

Further in accordance with the invention the collet may be reversible, providing a different grip range on each end of the collet. In this configuration, it is preferred to interpose a follower between the cam and the collet to provide a smooth surface for the cam and to distribute the force of the cam evenly across the fingers of the non-working end of the collet.

The advantages of such an apparatus are that it can be locked and unlocked far more quickly than a conventional tap wrench reducing the time needed to change taps. The reversible collet allows one wrench to take the place of two or more conventional wrenches while still covering the same range of tap sizes. Since the cam can be operated by the integral handle, which also turns the tap wrench, the need for an additional wrench for tightening the collet is eliminated.

The above and other features and advantages of the present invention will become more clear from the detailed description of a specific illustrative embodiment thereof, presented below in conjunction with the accompanying drawings.

DETAILED DESCRIPTION OF THE INVENTION

Figure 1:
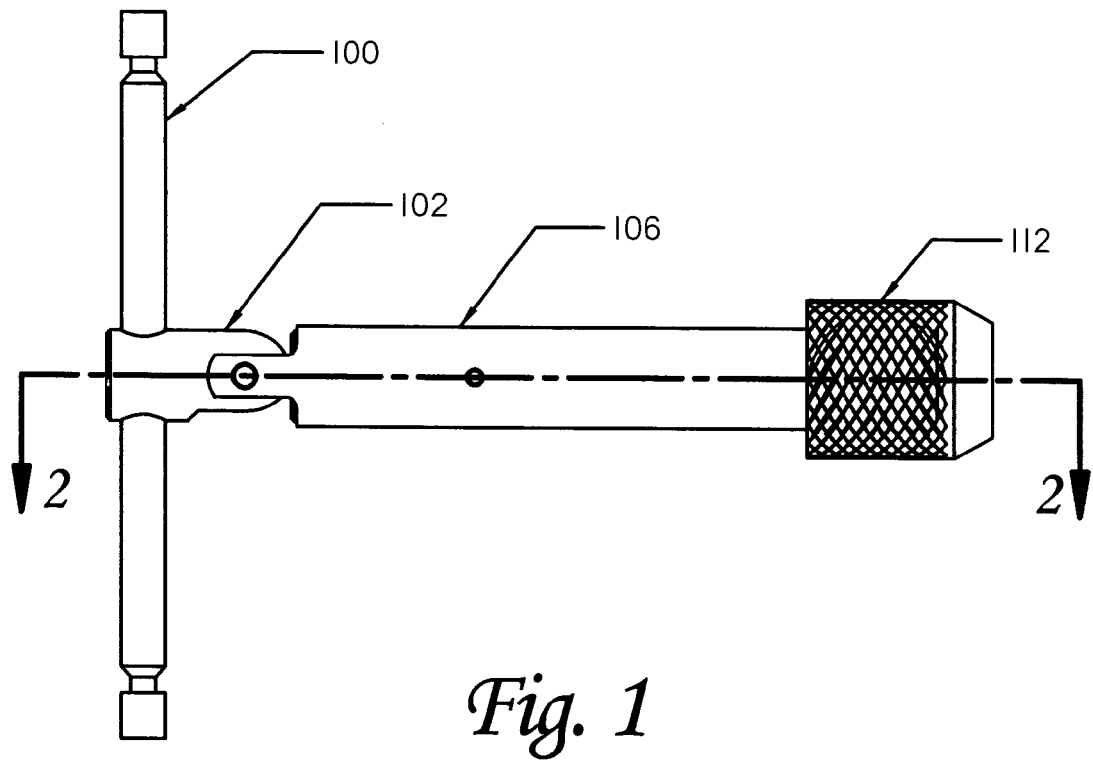
FIG. 1 is a top view of a tap wrench according to the present invention.
Figure 2:
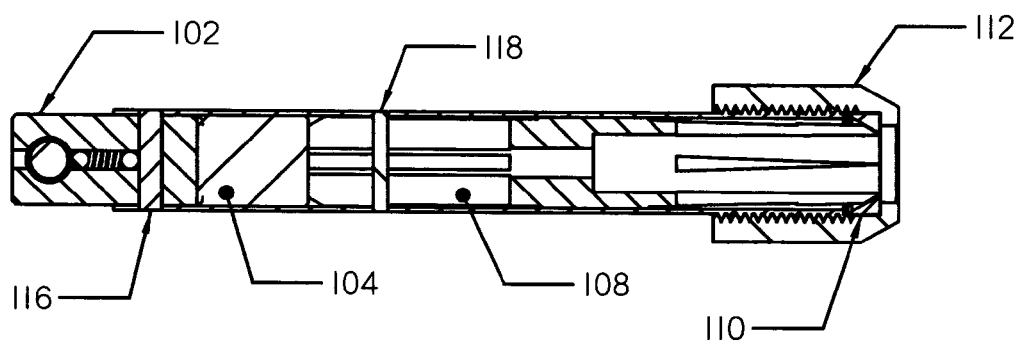
FIG. 2 is a cross section through the wrench orthogonal to the T-handle.
Figure 3:
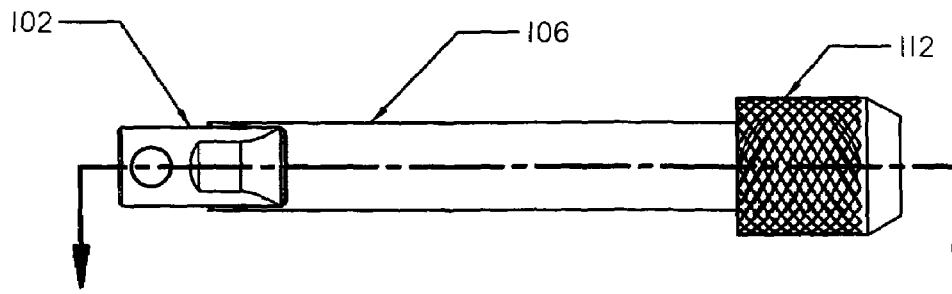
FIG. 3 is a side view of the wrench, orthogonal to the T-handle.
Figure 4:
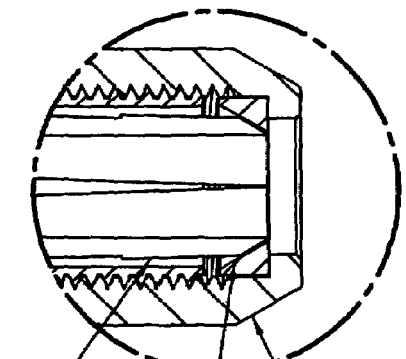
FIG. 4 is a detailed view of the nut, bushing, and end of the collet.
Figure 5:
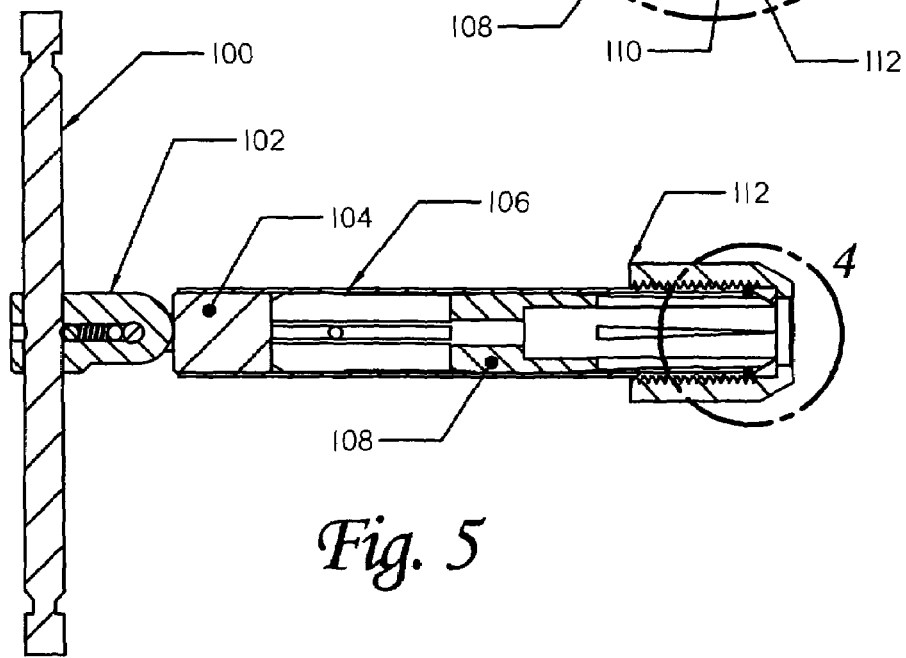
FIG. 5 is a cross section through the wrench at right angles to FIG. 2.

The following discussion focuses on the preferred embodiment of the invention, a cam operated tap wrench. However, as will be recognized by those skilled in the art, the disclosed method and apparatus are applicable to a wide variety of situations in which a device for gripping a hand tool is desired. One such application is that of a pin vise. Another is a handle for a metal file or wood rasp.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

A conventional tap wrench comprises a collet for gripping the tap and a tapered nut which is tightened onto the collet, forcing it closed against the tap. Typically, the collet is formed as an integral part of the body of the tap wrench. The collet has a relatively limited grip strength and limited grip range. The limited strength requires that the tapered nut be tightened by a separate wrench in order to achieve sufficient force against the collet. The limited grip range requires a typical user to own two or more tap wrenches in order to handle a typical range of tap sizes.

The present invention overcomes both of these drawbacks. While a nut is used, it is for coarse adjustment purposes only. The actual tightening of the tap wrench is achieved by the action of an integral cam acting, directly or indirectly, on the collet. This cam action allows for the application of significantly greater force being applied than can be applied in a conventional tap wrench without an external wrench. Because of this, the need for an additional wrench for tightening is eliminated. This makes the tap wrench much easier and quicker to use than a conventional alternative.

The present invention also incorporates a double ended, reversible collet. Each end covers a different range of tap sizes, allowing this single tap wrench to be used with a range of taps which would typically require at least two separate tap wrenches.

The present invention also offers the benefit of being more compact for storage purposes and lighter in weight than the multiple tools which it replaces.

Structure

Referring to FIGS. 1–10 the general structure of the inventive tap wrench can be seen. The body, 106, is substantially tubular and mounts or contains most of the remaining parts. It is threaded at one end to receive the nut, 112, and defines a yoke at the other which mounts the cam, 102. The central cavity of the wrench body receives the collet, 108, and the follower, 104, which are free to slide lengthwise within the body. While the body preferably has a circular cross section, for both the exterior surface and the interior cavity, other profiles are anticipated. As an example, a hexagonal cross section for the exterior surface would allow it to be engaged by a wrench for increased torque in turning the tap and a hexagonal interior profile would allow for engaging a hexagonal collet, as discussed below. In the preferred embodiment, pin, 118, passes through the body and engages slots in the collet, preventing rotation of the collet relative to the body while the wrench is in use. Pin, 116, pivotally mounts the cam to the body. If desired, the body can incorporate visible markings to indicate the operative positions of the cam as discussed below.

The collet, 108, is slidably received within the wrench body, 106, and serves to grip the tap, applying a rotational force to the tap when the wrench is turned. In the preferred embodiment the collet is double ended and reversible within the wrench body. Each end is formed with a plurality of flexible fingers which can flex at least slightly inward and outward radially. This action is the same as for a conventional tap wrench. The ends differ in the size of the opening in the end of the collet. One end is sized to accept taps approximately in the range of #0 through ¼" and the other accepts taps approximately in the range of ¼" through ½". The collet is reversed by removing the nut, 112, and bushing, 110, removing the collet from the wrench body, swapping the collet end for end, and reinserting the collet into the wrench body. The bushing and nut are then replaced and adjusted. In use, the inner end of the collet bears against the follower, 104, while the outer end bears against the bushing. The outer radius of the ends of the collet are tapered as is the inner radius of the bushing. The result is that as the collet is forced outward against the bushing, by the action of the cam, the cooperating tapers force the fingers of the collet together against the tap, gripping it tightly. The amount of force applied can be adjusted by turning the nut, moving it in or out relative to the collet. In the preferred embodiment the taper of the collet and bushing are steeper than in a conventional wrench to help assure that the collet releases the tap when the cam is released. As discussed above, the pin, 118, engages the fingers of the unused end of the collet to prevent it from rotating relative to the wrench body.

While the preferred embodiment of the collet is double ended, to provided greater grip range, the inventive tap wrench could clearly be made with a single ended collet. This would offer certain advantages, including eliminating the need for the follower, as a smooth end could be provided on the inner end of the collet on which the cam could bear; and the collet could be engaged directly by the wrench body, eliminating the need for pin, 118. Of course, a double ended collet could also directly engage the wrench body by forming the center section of the collet, between the two finger sections, in a profile, such as hex or square, which matched a profile formed in the inner walls of the wrench body.

The adjusting nut, 112, serves as a coarse adjustment mechanism by moving the bushing, 110, inward or outward relative to the wrench body, and thus the collet. This, in turn, alters the distance the collet will travel before contacting the bushing, and thus the degree of compression achieved after the end of the collet contacts the bushing. This allows the collet to be adjusted for the size of tap it will grip and the amount of force it will apply to the tap. Note that while similar in appearance to the nut on a conventional wrench, the function of this nut is significantly different. Where the nut on a conventional wrench actually applies the compressive force to the collet as it is tightened, the nut on the present invention serves only as an adjustment and to resist the force of the collet. The force is applied to the collet by the cam. If desired, the bushing can be eliminated and a taper formed on the inner radius of the nut to match the end of the collet. The nut would then serve all of the functions of the bushing except that it can not provide the reduced friction which the bushing can achieve. Alternatively, other means could be used to retain and compress the collet. An integral fitting on the end of the body would also work, although not providing adjustment. If used in combination with alternate adjustment means, such as a threaded mount for the cam pivot, allowing it to move in and out relative to the main body, similar functionality would be achieved.

The bushing, 110, receives the outer end of the collet, 108, as it is urged outward by the cam, 102. It has a tapered inner surface which closely matches the taper on the end of the collet. As the collet is forced against the bushing, the tapered cone applies an inward force to the fingers of the collet, bending them inward, into contact with the tap, thus causing the collet fingers to grip the tap. The primary advantage of using a bushing which is separate from the nut, 112, is that they can be made of different materials. The nut will preferably be made of hardened metal to withstand the forces generated by using the wrench. The bushing does not need to have the same strength and so can be made of a low friction material, such as glass filled nylon, brass, or self lubricating sintered bronze. This approach provides reduced friction without compromising strength.

The handle, 100, is a conventional T-handle as found in typical tap wrenches. It is received in a hole through the cam, 102, and can slide from end to end within that hole. In use, the handle would typically be centered, and is provided with a detent for that position which engages one of the spring loaded balls contained within the cam. For increase leverage, or for clearance, the handle can be positioned so that either end just passes through the cam. In the preferred embodiment, the handle is not removable, removal prevented by the shape of the grooves in the ends of the handle. Optionally, the handle could be removable. Note that the handle, while conventional in design, serves a purpose not found in a conventional wrench. While serving to rotation the wrench, about the central axis of the tap, as is typical, it also serves to rotate the cam about its pivot pin, 116, engaging and releasing the collet. Also note that when the cam is moved to its storage position, the handle is parallel to the body of the wrench. It can be slid toward the nut end of the wrench, so that the handle does not protrude beyond either end of the wrench, see FIG. 10. This provides a very compact and convenient storage position.

The cam, 102, is central to the functioning of the inventive tap wrench. It is mounted to the main body, 106, by pin, 116. It is free to pivot about the pin through approximately 180 degrees, optionally retained in selected positions by detent mechanism 114. In normal use, the cam will be positioned in alignment with the main body, as illustrated in FIGS. 1–5, in this position the eccentric curve of the cam is applying maximum force on the follower, the tap is locked in position, and the handle, 100, is perpendicular to the main body. In this position, the wrench can be used in the same manner as a conventional tap wrench. As discussed above, the cam could also bear directly upon the end of the collet if desired.

Figure 6:
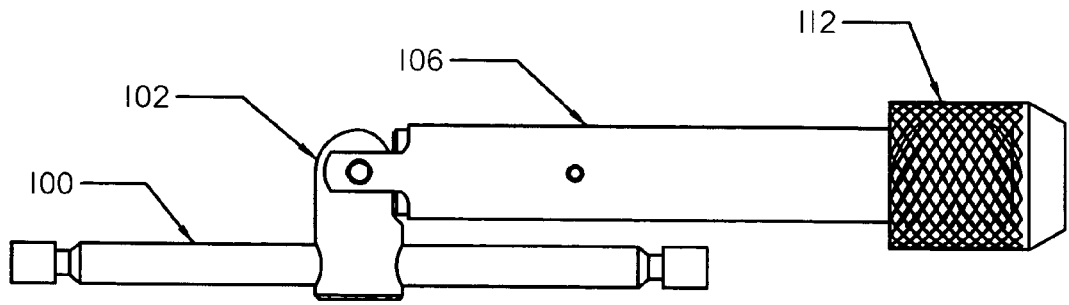
FIG. 6 is a top view of the wrench with the cam in the released position.
Figure 7:
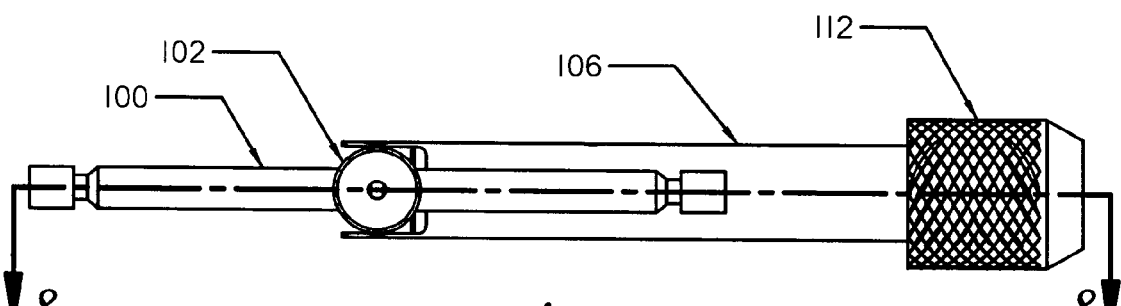
FIG. 7 is a side view of the wrench with the cam in the released position.
Figure 8:
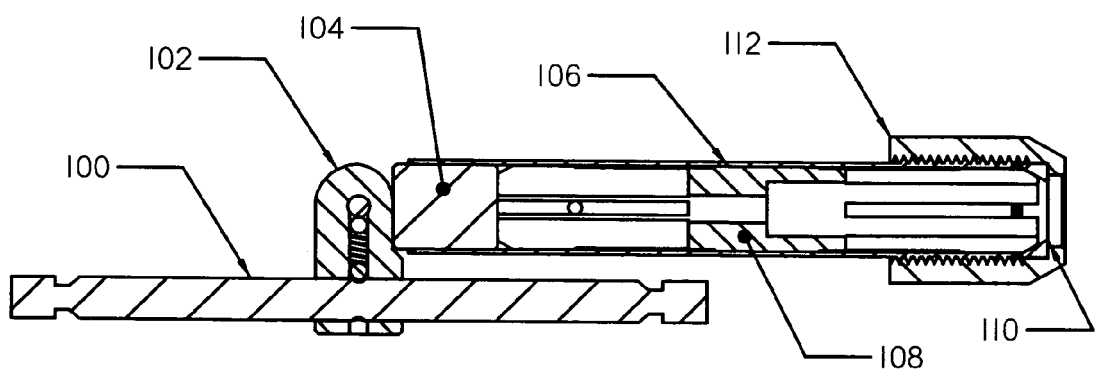
FIG. 8 is a cross section through the wrench with the cam in the released position.
Figure 9:
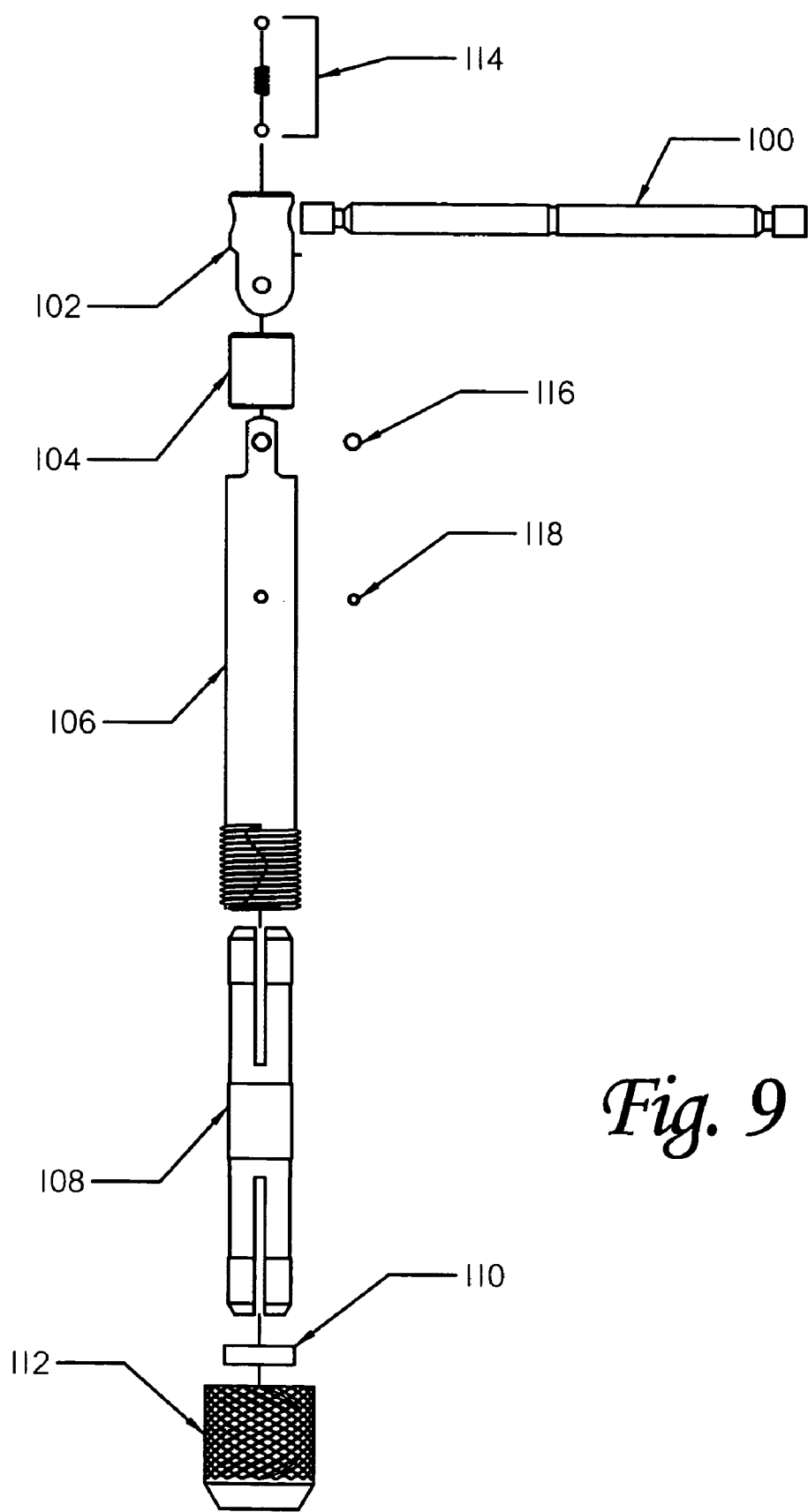
FIG. 9 is an exploded view of the wrench.
Figure 10:
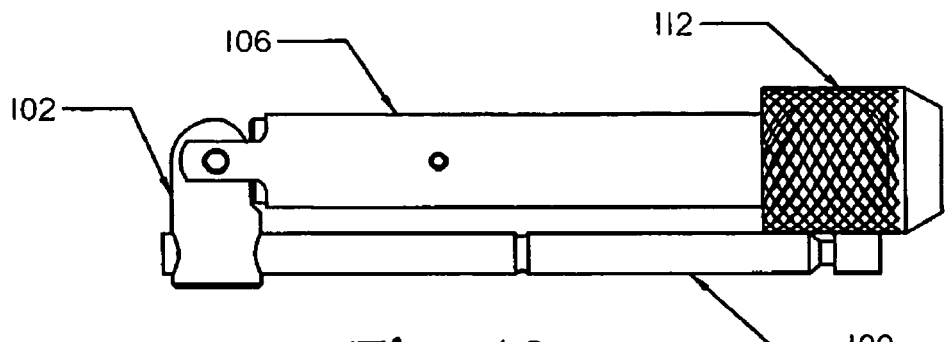
FIG. 10 is a top view of the wrench configured for storage.
Figure 11:
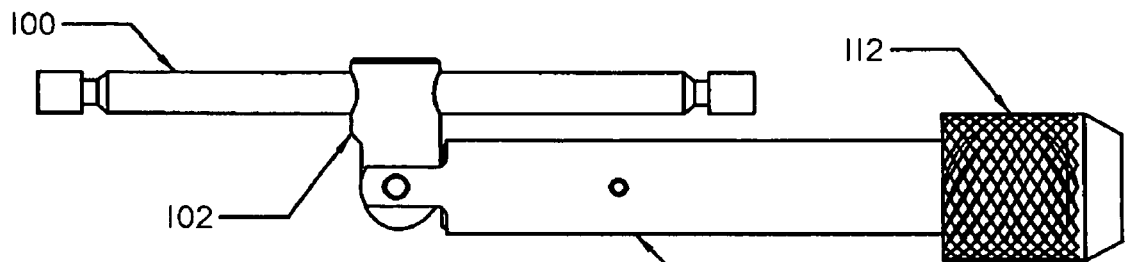
FIG. 11 illustrates the wrench with the cam in the second locked position, handle parallel to the body.

With the cam pivoted to the position illustrated in FIGS. 6–8, the minimum radius portion of the eccentric is aligned with the follower, the collet is allowed to retract, and the tap is released. This position is also the typical storage position for the wrench, with the handle parallel to the body and optionally positioned as shown in FIG. 10.

Figure 12:
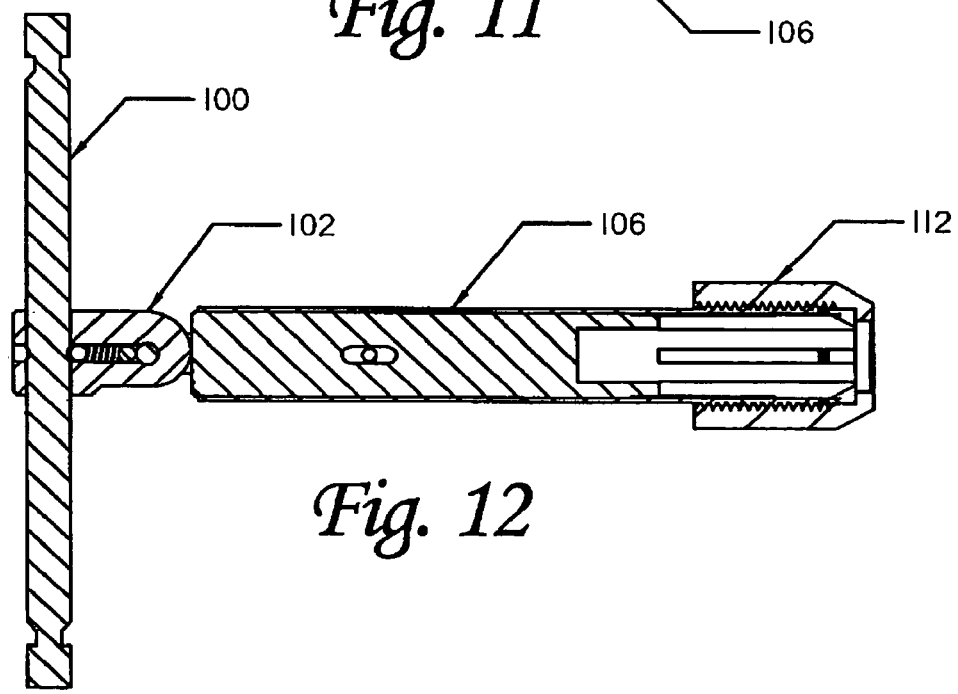
FIG. 12 is a cross section through an alternative embodiment of the wrench, comprising a single ended collet, in the same plane as FIG. 5.

The preferred embodiment also provides a second locking position as illustrated in FIG. 12. In this position the cam is substantially perpendicular to the body of the wrench, but opposite that in which it is stored. As illustrated, the eccentric radius at this position is the same as when the cam is in its normal operating position. However in this second locking position, the handle is substantially parallel to the body, rather than perpendicular to it. This provides reduced clearance requirements to nearby obstacles and allows the wrench to be spun rapidly about its central access for faster insertion and removal.

While the preferred embodiment provides two locked and one released positions, clearly other combinations are possible. One simple alternative is to release the collet when the cam is perpendicular to the body on either side and locked only when it is aligned with the body and the handle is perpendicular.

The preferred embodiment uses the handle to both engage/disengage the cam and to rotate the wrench. Clearly, the handle could be eliminated and the same functionality provided by engaging the cam with an external device, such as an open end wrench. In this approach a square or hexagonal cross section on the distal end of the cam would be advantageous.

The follower, 104, is interposed between the cam, 102, and the collet, 108. It serves primarily to transfer the force of the cam to the inner end of the collet while providing a smooth surface for the cam to ride against. This is advantageous where a double ended collet is used to avoid having the cam bear directly upon the fingers of the inner collet end. Where a single ended collet is used, the follower can be eliminated as it offers no advantage.

Operation

Operation of the inventive tap wrench is simple and straight-forward. To insert a tap, the cam will be moved to the released position by using the handle as a lever. If necessary, the nut will be loosened to allow the fingers of the collet to expand. The tap is then partially inserted into the collet and the nut adjusted so that the collet nearly grips the tap. The cam is then rotated to the locked position, again using the handle as a lever. If desired, the cam can be released and the nut adjusted to increase or decrease the gripping force, and the cam re-locked.

With the tap locked in place, and the handle perpendicular to the main body, the tap wrench is used in the same manner as a conventional wrench. If desired, the cam can also be rotated to the side locking position, allowing it to be spun rapidly, much like a screwdriver, or to provide clearance from nearby obstructions.

If the tap is too large, or too small, for the collet, the nut can be removed, the collet reversed, and the nut replaced prior to inserting the tap.

When the threading operation is complete, the cam is again released and the tap removed.

Materials

A variety of materials are applicable and most would be the same as those used in conventional wrenches such as hardened steel for the collet and nut, to accommodate the stresses involved.

The cam and follower should be made of a material having good strength, low friction, and a resistance to galling. Steel would be a viable option but other materials are also applicable.

The bushing should be made of a low friction material to reduce the forces required to operate the cam and to assure that the collet retracts when the cam is released. Glass filled nylon has been found to perform well and self lubricating materials, such as oil impregnated sintered bronze, typically used for bearings should also work well.

The above materials are intended to be illustrative only. Other material can be used within the scope of the present invention.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A tool holder for a hand tool, comprising:
    a) a main body defining an internal cavity having two ends;
    b) a collet, adapted to be slidably received within said cavity and to grip the hand tool;
    c) retaining means which prevents said collet from exiting a first end of said cavity;
    d) a cam, pivotally mounted to said body, proximate a second end of said cavity, adjacent said collet; and
    e) means to adjust said force applied by said cam on said collet;
    wherein said cam has a first, released position where it applies no force to said collet, and a second, locked position where it applies force to a first end of said collet, urging a second end of said collet against said retaining means, said force causing said collet to compress thereby gripping the tool.

2. A tool holder for a hand tool, comprising:
    a) a main body defining an internal cavity having two ends;
    b) a collet, having first and second ends, positioned within and closely received by said cavity, said collet adapted to grip the hand tool;
    c) means to prevent said collet from rotating within said cavity;
    d) adjustable retaining means which prevents said collet from exiting a first end of said cavity; and
    e) a cam, pivotally mounted to said body, in a position to apply a force to said collet which urges said collet against said retaining means;
    wherein said cam has a first, released position where it applies no force to said collet, and a second, locked position where it applies force to said first end of said collet, urging said second end of said collet against said retaining means, said force causing said collet to compress thereby gripping the tool.

3. The tool holder of claim 2 further comprising a handle operatively coupled to said cam whereby it can apply a force to pivot said cam between said first and second positions.

4. The tool holder of claim 3 wherein when said cam is in said locked position said handle is substantially orthogonal to said body and wherein said cam is in said released position said handle is substantially parallel to said body.

5. The tool holder of claim 4 wherein said cam has a second locked position wherein said handle is also substantially parallel to said body.

6. The tool holder of claim 5 wherein said collet is reversible, each of said first and second ends being adapted to grip a different size range of tools.

7. The tool holder of claim 6 further comprising a cam follower interposed between said cam and said collet and adapted to transfer said force from said cam to said collet.

8. A tool holder for hand tools, comprising:
    a) a main body defining an internal cavity having first and second ends;
    b) adjustable retaining means coupled to said body near said first end;
    c) cam follower means positioned within said cavity, near said second end;
    d) a collet, having first and second ends, positioned within and closely received by said cavity, between said retaining means and said cam follower, said collet adapted to grip the hand tool; and
    e) a cam, pivotally mounted to said body, in a position to bear against said cam follower, said cam movable between a released and a locked position
        wherein when said cam is in said released position it applies no force to said collet, and when in said locked position it applies force to said cam follower which it transfers to said collet, urging said collet against said retaining means,
        and wherein when said collet is urged against said retaining means, said retaining means forces said collet to compress thereby gripping the tool.

9. The tool holder of claim 8 further comprising a handle operatively coupled to said cam whereby it can apply a force to pivot said cam between said first and second positions and wherein when said cam is in said locked position said handle is substantially orthogonal to said body and wherein said cam is in said released position said handle is substantially parallel to said body.

10. The tool holder of claim 9 wherein said cam has a second locked position wherein said handle is also substantially parallel to said body.

11. The tool holder of claim 10 wherein said collet is reversible, each of said first and second ends being adapted to grip a different size range of tools.

* * * * *